(12) United States Patent
Merriman et al.

(10) Patent No.: US 9,437,859 B2
(45) Date of Patent: Sep. 6, 2016

(54) BATTERY CELL INTERCONNECT AND VOLTAGE SENSING ASSEMBLY AND A BATTERY MODULE

(71) Applicant: LG Chem, Ltd., Seoul (KR)

(72) Inventors: Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 408 days.

(21) Appl. No.: 14/246,178

(22) Filed: Apr. 7, 2014

(65) Prior Publication Data

US 2015/0285839 A1  Oct. 8, 2015

(51) Int. Cl.
| | |
|---|---|
| *H01M 10/48* | (2006.01) |
| *H01M 2/20* | (2006.01) |
| *H01M 10/42* | (2006.01) |
| *H01M 10/6557* | (2014.01) |

(52) U.S. Cl.
CPC ......... *H01M 2/202* (2013.01); *H01M 10/4207* (2013.01); *H01M 10/482* (2013.01); *H01M 10/6557* (2015.04); *H01M 2010/4271* (2013.01)

(58) Field of Classification Search
CPC ........... H01M 2/202; H01M 10/4207; H01M 10/482; H01M 10/6557; H01M 2010/4271
See application file for complete search history.

(56) References Cited

U.S. PATENT DOCUMENTS

| | | | |
|---|---|---|---|
| 4,409,304 A | 10/1983 | Gerard et al. | |
| 5,503,948 A | 4/1996 | Mackay et al. | |
| 5,639,571 A | 6/1997 | Waters et al. | |
| 5,856,041 A | 1/1999 | Inoue et al. | |
| 6,023,146 A | 2/2000 | Casale et al. | |
| 6,261,719 B1 | 7/2001 | Ikeda et al. | |
| 6,521,363 B1 | 2/2003 | Yeh | |
| 6,773,301 B1 | 8/2004 | Chaskin | |
| 7,229,327 B2 | 6/2007 | Zhao et al. | |
| 7,270,576 B2 | 9/2007 | Kim et al. | |
| 7,270,912 B2 | 9/2007 | Oogami | |
| 7,294,020 B2 | 11/2007 | Zhao et al. | |

(Continued)

FOREIGN PATENT DOCUMENTS

| | | |
|---|---|---|
| EP | 1089373 A | 4/2001 |
| GB | 2084390 A | 4/1982 |

(Continued)

OTHER PUBLICATIONS

International Search Report for International Patent Application No. PCT/KR2009/003438 dated Jan. 22, 2010.

(Continued)

*Primary Examiner* — Raymond Alejandro
(74) *Attorney, Agent, or Firm* — Buckert Patent & Trademark Law Firm, PC; John F. Buckert

(57) ABSTRACT

A battery cell interconnect and voltage sensing assembly is provided. The assembly includes a plastic frame member having a first side and a second side, and first, second, third and fourth elongated apertures extending therethrough. The assembly further includes an elongated interconnect member coupled to the plastic frame member and extends past both the first and third apertures. The elongated interconnect member is coupled to both a first electrical terminal of a first battery cell extending through the first elongated aperture, and a first electrical terminal of a second battery cell extending through the third elongated aperture. The elongated interconnect member has a spade lug coupled to a wire harness assembly.

13 Claims, 11 Drawing Sheets

(56) References Cited

U.S. PATENT DOCUMENTS

| | | |
|---|---|---|
| 7,507,124 B2 | 3/2009 | Kim |
| 7,563,137 B1 | 7/2009 | Koetting et al. |
| 7,578,702 B1 | 8/2009 | Tom et al. |
| 7,642,746 B2 | 1/2010 | Kim et al. |
| 7,762,848 B2 | 7/2010 | Koetting et al. |
| 8,035,986 B2 | 10/2011 | Koetting et al. |
| 2003/0027039 A1 | 2/2003 | Benson et al. |
| 2003/0213121 A1 | 11/2003 | Rouillard et al. |
| 2004/0043663 A1 | 3/2004 | Ikeda et al. |
| 2005/0031945 A1 | 2/2005 | Morita et al. |
| 2005/0130033 A1 | 6/2005 | Iwamura et al. |
| 2006/0127754 A1 | 6/2006 | Hamada et al. |
| 2006/0177733 A1 | 8/2006 | Ha et al. |
| 2006/0194101 A1 | 8/2006 | Ha et al. |
| 2006/0234558 A1 | 10/2006 | Li |
| 2007/0238018 A1 | 10/2007 | Lee et al. |
| 2008/0124617 A1 | 5/2008 | Bjork |
| 2008/0169788 A1 | 7/2008 | Bobbin et al. |
| 2008/0254356 A1 | 10/2008 | Liersch et al. |
| 2009/0139781 A1 | 6/2009 | Straubel |
| 2009/0325042 A1 | 12/2009 | Koetting et al. |
| 2010/0062329 A1 | 3/2010 | Muis |
| 2012/0045682 A1* | 2/2012 | Oury ............... H01M 10/0525 429/120 |
| 2012/0088140 A1 | 4/2012 | Kardasz et al. |
| 2013/0029204 A1 | 1/2013 | Khakhalev et al. |
| 2013/0052503 A1 | 2/2013 | Payne |
| 2013/0052511 A1 | 2/2013 | Khakhalev |
| 2013/0216878 A1* | 8/2013 | Merriman ............. H01M 2/206 429/92 |
| 2015/0037641 A1* | 2/2015 | Pinon ................. H01M 2/1077 429/99 |

FOREIGN PATENT DOCUMENTS

| | | |
|---|---|---|
| JP | 2000123802 A | 4/2000 |
| KR | 20070100555 A | 10/2007 |
| KR | 20080027504 A | 3/2008 |
| KR | 20100003146 A | 1/2010 |
| WO | 0030190 A | 5/2000 |

OTHER PUBLICATIONS

International Search Report for International Patent Application No. PCT/KR2009/003440 dated Jan. 22, 2010.

* cited by examiner

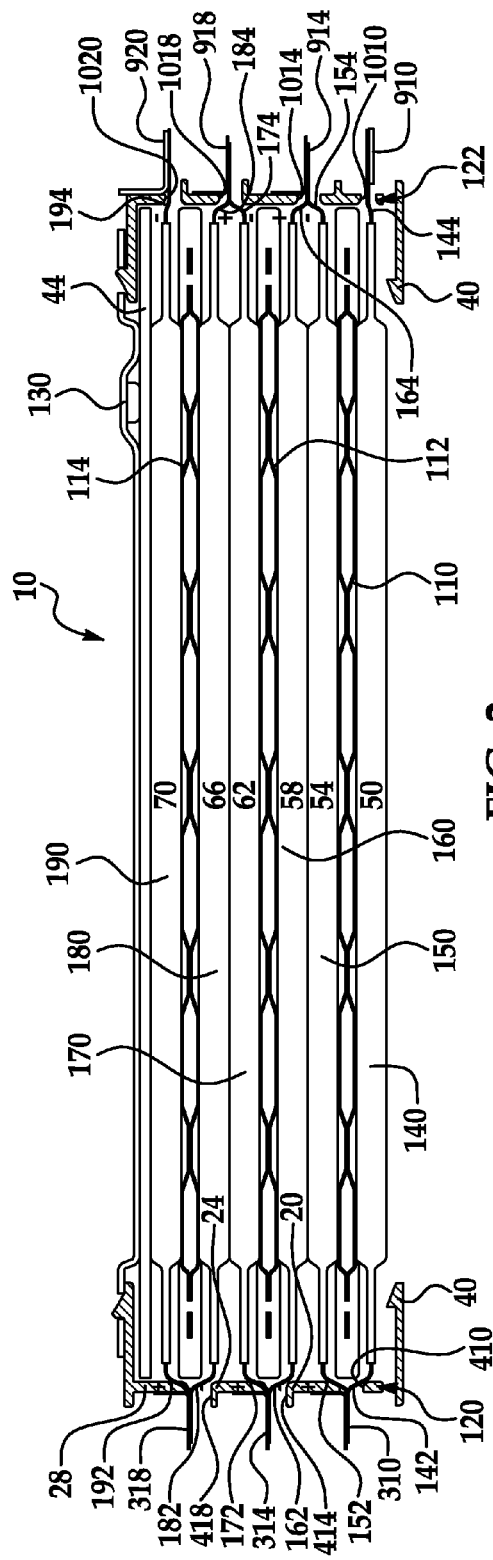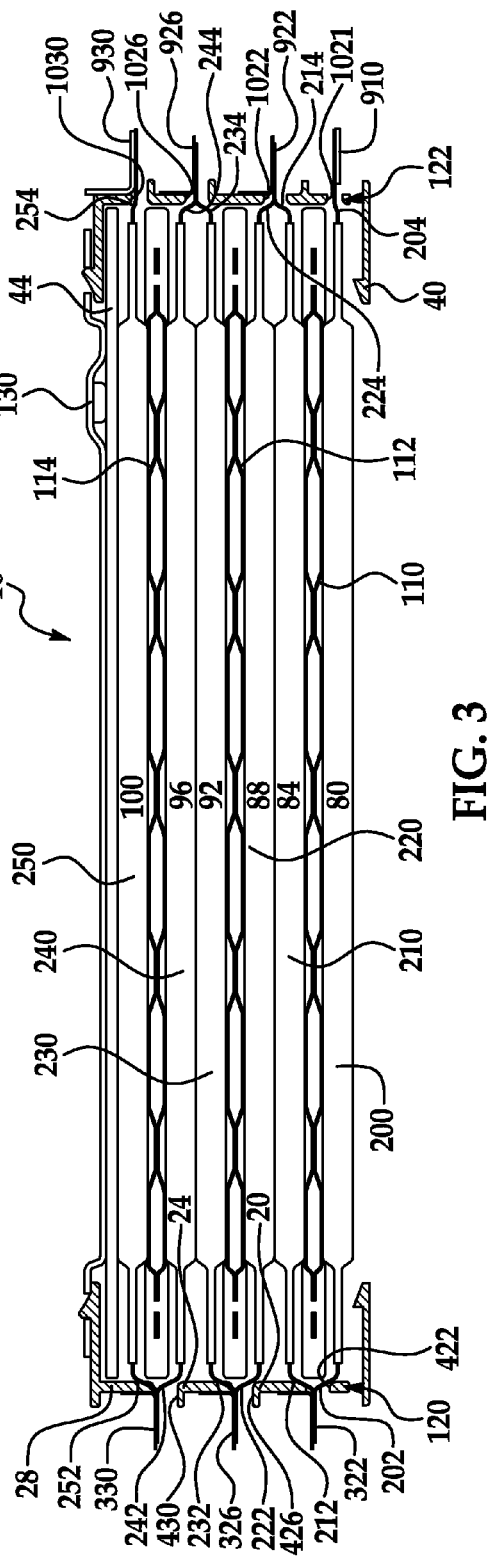

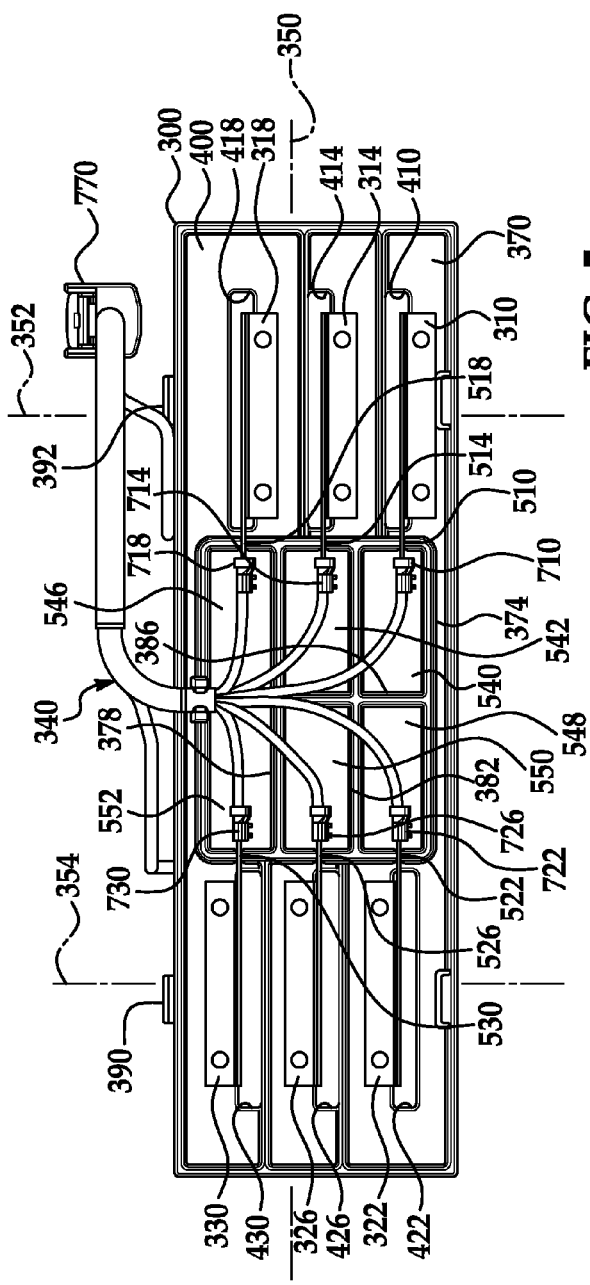
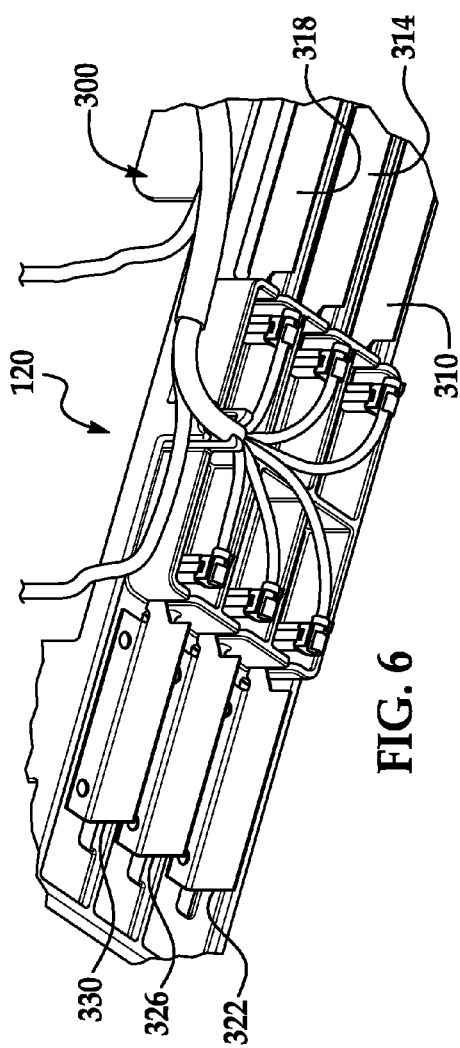

BATTERY CELL INTERCONNECT AND VOLTAGE SENSING ASSEMBLY AND A BATTERY MODULE

BACKGROUND

The inventors herein have recognized a need for an improved battery cell interconnect and voltage sensing assembly and a battery module which utilizes the assembly.

SUMMARY

A battery cell interconnect and voltage sensing assembly in accordance with an exemplary embodiment is provided. The assembly includes a plastic frame member having a first side and a second side. The plastic frame member has first, second, third and fourth elongated apertures extending therethrough. The first, second, third and fourth elongated apertures extend substantially parallel to a longitudinal axis of the plastic frame member. The first and second elongated apertures are centered about a first axis. The third and fourth elongated apertures are centered about a second axis. The first and second axes are perpendicular to the longitudinal axis and disposed a longitudinal distance apart from one another. The assembly further includes an elongated interconnect member that is coupled to the plastic frame member and extends past both the first and third apertures. The elongated interconnect member is configured to be electrically and physically coupled to both a first electrical terminal of a first battery cell extending through the first elongated aperture, and a first electrical terminal of a second battery cell extending through the third elongated aperture. The elongated interconnect member has a spade lug. The assembly further includes a first interconnect member that is coupled to the plastic frame member on the first side thereof. The first interconnect member is configured to be electrically and physically coupled to a first electrical terminal of a third battery cell extending through the second elongated aperture. The first interconnect member has a spade lug. The assembly further includes a second interconnect member that is coupled to the plastic frame member on the first side thereof. The second interconnect member is configured to be electrically and physically coupled to a first electrical terminal of a fourth battery cell extending through the fourth elongated aperture. The second interconnect member has a spade lug. The assembly further includes a wire harness assembly having first, second, and third spade clips. The first spade clip is electrically and physically coupled to the spade lug of the elongated interconnect member. The second spade clip is electrically and physically coupled to the spade lug of the first interconnect member. The third spade clip is electrically and physically coupled to the spade lug of the second interconnect member.

A battery module in accordance with another exemplary embodiment is provided. The battery module includes a first battery cell having a first housing and first and second electrical terminals extending outwardly from first and second ends, respectively, of the first housing. The battery module further includes a second battery cell having a second housing and first and second electrical terminals extending outwardly from first and second ends, respectively, of the second housing. The battery module further includes a third battery cell having a third housing and first and second electrical terminals extending outwardly from first and second ends, respectively, of the third housing. The battery module further includes a fourth battery cell having a fourth housing and first and second electrical terminals extending outwardly from first and second ends, respectively, of the fourth housing. The battery module further includes a first battery cell interconnect and voltage sensing assembly having a first plastic frame member, an elongated interconnect member, a first interconnect member, a second interconnect member, and a first wire harness assembly. The first plastic frame member has a first side and a second side. The first plastic frame member has first, second, third and fourth elongated apertures extending therethrough. The first, second, third and fourth elongated apertures extend substantially parallel to a longitudinal axis of the first plastic frame member. The first and second elongated apertures are centered about a first axis. The third and fourth elongated apertures are centered about a second axis. The first and second axes are perpendicular to the longitudinal axis and are disposed a longitudinal distance apart from one another. The elongated interconnect member is coupled to the first plastic frame member and extends past both the first and third apertures. The elongated interconnect member is electrically and physically coupled to both the first electrical terminal of the first battery cell extending through the first elongated aperture, and the first electrical terminal of the second battery cell extending through the third elongated aperture. The elongated interconnect member has a spade lug. The first interconnect member is coupled to the first plastic frame member on the first side thereof. The first interconnect member is electrically and physically coupled to the first electrical terminal of the third battery cell extending through the second elongated aperture. The first interconnect member has a spade lug. The second interconnect member is coupled to the first plastic frame member on the first side thereof. The second interconnect member is electrically and physically coupled to the first electrical terminal of the fourth battery cell extending through the fourth elongated aperture. The second interconnect member has a spade lug. The assembly further includes a first wire harness assembly having first, second, and third spade clips. The first spade clip is electrically and physically coupled to the spade lug of the elongated interconnect member. The second spade clip is electrically and physically coupled to the spade lug of the first interconnect member. The third spade clip is electrically and physically coupled to the spade lug of the second interconnect member.

BRIEF DESCRIPTION OF THE DRAWINGS

FIG. 2 is a cross-sectional schematic of a portion of the battery module of FIG. 1;

FIG. 3 is another cross-sectional schematic of a portion of the battery module of FIG. 1;

FIG. 5 is another schematic of the first battery cell interconnect and voltage sensing assembly of FIG. 4;

FIG. 6 is an enlarged schematic of the first battery cell interconnect and voltage sensing assembly of FIG. 4;

DETAILED DESCRIPTION

Figure 1:
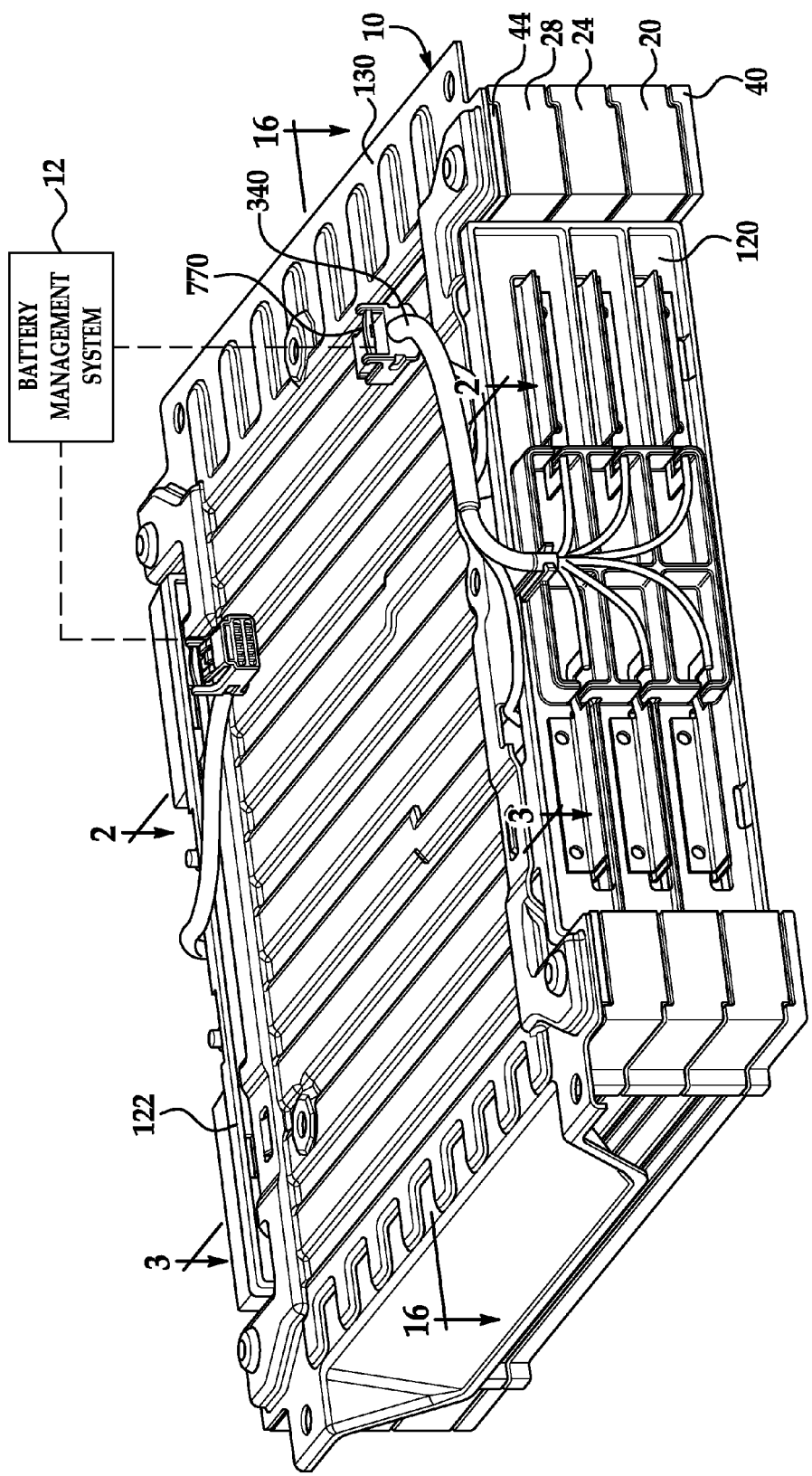
FIG. 1 is a schematic of a battery module having first and second battery cell interconnect and voltage sensing assemblies in accordance with an exemplary embodiment.

Referring to FIGS. 1-9 and 16, a battery module 10 in accordance with an exemplary embodiment is provided. The battery module 10 is electrically coupled to a battery management system 12. The battery module 10 includes frame members 20, 24, 28, insulating layers 40, 44, battery cells 50, 54, 58, 62, 66, 70, 80, 84, 88, 92, 96, 100, heat exchangers 110, 112, 114, battery cell interconnect and voltage sensing assemblies 120, 122, and an end plate 130.

Referring to FIGS. 1 and 2, the frame member 20 and the insulating layer 40 are configured to hold the battery cell 50, the heat exchanger 110, and the battery cell 54, therebetween. The heat exchanger 110 is disposed between the battery cells 50, 54. Referring to FIGS. 1 and 3, the frame member 20 and the insulating layer 40 are further configured to hold the battery cell 80, the heat exchanger 110, and the battery cell 84 therebetween. The heat exchanger 110 is further disposed between the battery cells 80, 84.

Referring to FIGS. 1 and 2, the frame member 20 and the frame member 24 are configured to hold the battery cell 58, the heat exchanger 112, and the battery cell 62, therebetween. The heat exchanger 112 is disposed between the battery cells 58, 62. Referring to FIGS. 1 and 3, the frame member 20 and the frame member 24 are further configured to hold the battery cell 88, the heat exchanger 112, and the battery cell 92 therebetween. The heat exchanger 112 is further disposed between the battery cells 88, 92.

Referring to FIGS. 1 and 2, the frame member 24 and the frame member 28 are configured to hold the battery cell 66, the heat exchanger 114, and the battery cell 70, therebetween. The heat exchanger 114 is disposed between the battery cells 66, 70. Referring to FIGS. 1 and 3, the frame member 24 and the frame member 28 are further configured to hold the battery cell 96, the heat exchanger 114, and the battery cell 100 therebetween. The heat exchanger 114 is further disposed between the battery cells 96, 100.

The battery cells 50, 54, 58, 62, 66, 70, 80, 84, 88, 92, 96, 100 are each configured to generate an operational voltage. In one exemplary embodiment, the battery cells 50-100 are pouch-type lithium-ion battery cells that have a generally rectangular-shaped body portion and a pair of electrical terminals. In an exemplary embodiment, the battery cells 50-100 are electrically coupled in series with one another utilizing interconnect members on the battery cell interconnect and voltage sensing assemblies 120, 122. Further, in an exemplary embodiment, the electrical terminals of the battery cells 50-100 are coupled to corresponding interconnect members by ultrasonically welding the electrical terminals of the battery cells 50-100 to the corresponding interconnect members utilizing an ultrasonic welding machine.

Referring to FIGS. 1 and 2, the battery cell 50 has a rectangular-shaped housing 140 with electrical terminals 142, 144, extending from first and second ends, respectively, of the housing 140. The electrical terminal 142 extends through the elongated aperture 410 and is electrically and physically coupled to the interconnect member 310 of the battery cell interconnect and voltage sensing assembly 120. The electrical terminal 144 extends through the elongated aperture 1010 and is electrically and physically coupled to the interconnect member 910 of the battery cell interconnect and voltage sensing assembly 122. The battery cell 50 is disposed between the insulating layer 40 and the heat exchanger 110.

The battery cell 54 has a rectangular-shaped housing 150 with electrical terminals 152, 154, extending from first and second ends, respectively, of the housing 150. The electrical terminal 152 extends through the elongated aperture 410 and is electrically and physically coupled to the interconnect member 310 of the battery cell interconnect and voltage sensing assembly 120. The electrical terminal 154 extends through the elongated aperture 1014 and is electrically and physically coupled to the interconnect member 914 of the battery cell interconnect and voltage sensing assembly 122. The battery cell 54 is disposed between the heat exchanger 110 and the battery cell 58.

The battery cell 58 has a rectangular-shaped housing 160 with electrical terminals 162, 164, extending from first and second ends, respectively, of the housing 160. The electrical terminal 162 extends through the elongated aperture 414 and is electrically and physically coupled to the interconnect member 314 of the battery cell interconnect and voltage sensing assembly 120. The electrical terminal 164 extends through the elongated aperture 1014 and is electrically and physically coupled to the interconnect member 914 of the battery cell interconnect and voltage sensing assembly 122. The battery cell 58 is disposed between the battery cell 54 and the heat exchanger 112.

The battery cell 62 has a rectangular-shaped housing 170 with electrical terminals 172, 174, extending from first and second ends, respectively, of the housing 170. The electrical terminal 172 extends through the elongated aperture 414 and is electrically and physically coupled to the interconnect member 314 of the battery cell interconnect and voltage sensing assembly 120. The electrical terminal 174 extends through the elongated aperture 1018 and is electrically and physically coupled to the interconnect member 918 of the battery cell interconnect and voltage sensing assembly 122. The battery cell 62 is disposed between the heat exchanger 112 and the battery cell 66.

The battery cell 66 has a rectangular-shaped housing 180 with electrical terminals 182, 184, extending from first and second ends, respectively, of the housing 180. The electrical terminal 182 extends through the elongated aperture 418 and is electrically and physically coupled to the interconnect member 318 of the battery cell interconnect and voltage sensing assembly 120. The electrical terminal 184 extends through the elongated aperture 1018 and is electrically and physically coupled to the interconnect member 918 of the battery cell interconnect and voltage sensing assembly 122.

The battery cell 66 is disposed between the battery cell 62 and the heat exchanger 114.

The battery cell 70 has a rectangular-shaped housing 190 with electrical terminals 192, 194, extending from first and second ends, respectively, of the housing 190. The electrical terminal 192 extends through the elongated aperture 418 and is electrically and physically coupled to the interconnect member 318 of the battery cell interconnect and voltage sensing assembly 120. The electrical terminal 194 extends through the elongated aperture 1020 and is electrically and physically coupled to the interconnect member 920 of the battery cell interconnect and voltage sensing assembly 122. The interconnect member 920 is further electrically and physically coupled to the post 932 (shown in FIG. 12). The battery cell 70 is disposed between the heat exchanger 114 and the insulating layer 44.

Referring to FIGS. 1-3, the series combination of the battery cells 50-70 are electrically coupled in series with the series combination of the battery cells 80-100 utilizing the elongated interconnect member 910.

Referring to FIG. 3, the battery cell 80 has a rectangular-shaped housing 200 with electrical terminals 202, 204, extending from first and second ends, respectively, of the housing 200. The electrical terminal 202 extends through the elongated aperture 422 and is electrically and physically coupled to the interconnect member 322 of the battery cell interconnect and voltage sensing assembly 120. The electrical terminal 204 extends through the elongated aperture 1021 and is electrically and physically coupled to the interconnect member 910 of the battery cell interconnect and voltage sensing assembly 122. The battery cell 80 is disposed between the insulating layer 40 and the heat exchanger 110.

The battery cell 84 has a rectangular-shaped housing 210 with electrical terminals 212, 214, extending from first and second ends, respectively, of the housing 210. The electrical terminal 212 extends through the elongated aperture 422 and is electrically and physically coupled to the interconnect member 322 of the battery cell interconnect and voltage sensing assembly 120. The electrical terminal 214 extends through the elongated aperture 1022 and is electrically and physically coupled to the interconnect member 922 of the battery cell interconnect and voltage sensing assembly 122. The battery cell 84 is disposed between the heat exchanger 110 and the battery cell 88.

The battery cell 88 has a rectangular-shaped housing 220 with electrical terminals 222, 224, extending from first and second ends, respectively, of the housing 220. The electrical terminal 222 extends through the elongated aperture 426 and is electrically and physically coupled to the interconnect member 326 of the battery cell interconnect and voltage sensing assembly 120. The electrical terminal 224 extends through the elongated aperture 1022 and is electrically and physically coupled to the interconnect member 922 of the battery cell interconnect and voltage sensing assembly 122. The battery cell 88 is disposed between the battery cell 84 and the heat exchanger 112.

The battery cell 92 has a rectangular-shaped housing 230 with electrical terminals 232, 234, extending from first and second ends, respectively, of the housing 230. The electrical terminal 232 extends through the elongated aperture 426 and is electrically and physically coupled to the interconnect member 326 of the battery cell interconnect and voltage sensing assembly 120. The electrical terminal 234 extends through the elongated aperture 1026 and is electrically and physically coupled to the interconnect member 926 of the battery cell interconnect and voltage sensing assembly 122. The battery cell 92 is disposed between the heat exchanger 112 and the battery cell 96.

The battery cell 96 has a rectangular-shaped housing 240 with electrical terminals 242, 244, extending from first and second ends, respectively, of the housing 240. The electrical terminal 242 extends through the elongated aperture 430 and is electrically and physically coupled to the interconnect member 330 of the battery cell interconnect and voltage sensing assembly 120. The electrical terminal 244 extends through the elongated aperture 1026 and is electrically and physically coupled to the interconnect member 926 of the battery cell interconnect and voltage sensing assembly 122. The battery cell 96 is disposed between the battery cell 92 and the heat exchanger 114.

The battery cell 100 has a rectangular-shaped housing 250 with electrical terminals 252, 254, extending from first and second ends, respectively, of the housing 250. The electrical terminal 252 extends through the elongated aperture 430 and is electrically and physically coupled to the interconnect member 330 of the battery cell interconnect and voltage sensing assembly 120. The electrical terminal 254 extends through the elongated aperture 1030 and is electrically and physically coupled to the interconnect member 930 of the battery cell interconnect and voltage sensing assembly 122. The interconnect member 930 is further electrically and physically coupled to the post 934 (shown in FIG. 12). The battery cell 100 is disposed between the heat exchanger 114 and the insulating layer 44. The end plate 130 is disposed on the insulating layer 44.

Referring to FIGS. 2 and 3, the heat exchanger 110 is disposed between and contacts the battery cells 50, 54. Further, the heat exchanger 110 is disposed between and contacts the battery cells 80, 84. In an exemplary embodiment, heat exchanger 110 is constructed of aluminum and defines a plurality of passages extending therethrough. A cooling system urges air through the plurality of passages in the heat exchanger 110 which extracts heat energy from the battery cells 50, 54, 80, 84 to cool the battery cells 50, 54, 80, 84.

The heat exchanger 112 is disposed between and contacts the battery cells 58, 62. Further, the heat exchanger 112 is disposed between and contacts the battery cells 88, 92. In an exemplary embodiment, heat exchanger 112 is constructed of aluminum and defines a plurality of passages extending therethrough. The cooling system urges air through the plurality of passages in the heat exchanger 112 which extracts heat energy from the battery cells 58, 62, 88, 92 to cool the battery cells 58, 62, 88, 92.

The heat exchanger 114 is disposed between and contacts the battery cells 66, 70. Further, the heat exchanger 114 is disposed between and contacts the battery cells 96, 100. In an exemplary embodiment, heat exchanger 114 is constructed of aluminum and defines a plurality of passages extending therethrough. The cooling system urges air through the plurality of passages in the heat exchanger 114 which extracts heat energy from the battery cells 66, 70, 96, 100 to cool the battery cells 66, 70, 96, 100.

Figure 10:
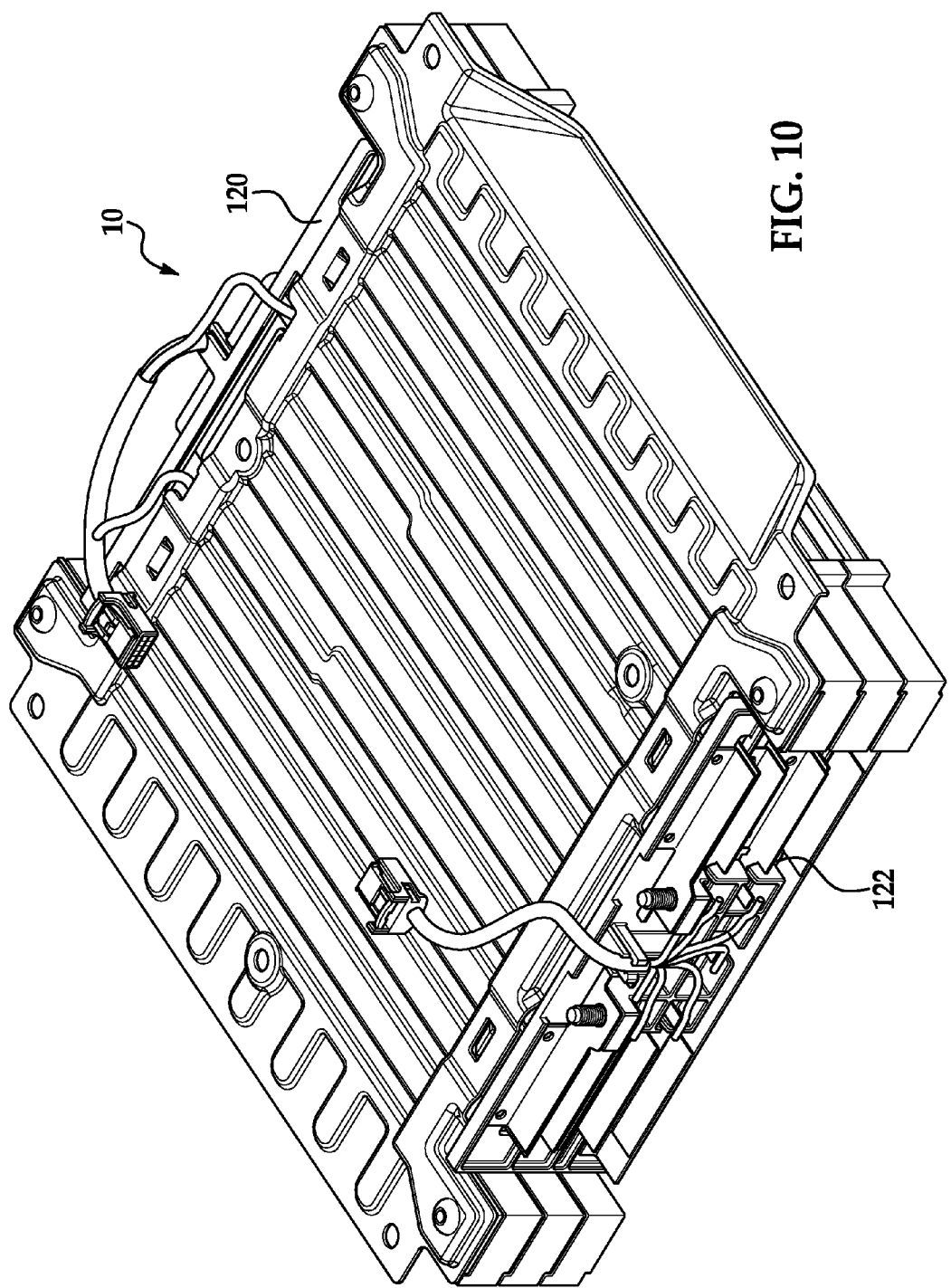
FIG. 10 is another schematic of the battery module of FIG. 1.

Referring to FIGS. 1 and 10, the battery cell interconnect and voltage sensing assemblies 120, 122 are configured to electrically couple the battery cells 50-100 in series with one another.

Referring to FIGS. 2-5, the battery cell interconnect and voltage sensing assembly 120 will now be described. The assembly 120 includes a plastic frame member 300, interconnect members 310, 314, 318, 322, 326, 330, and a wire harness assembly 340.

The plastic frame member 300 is provided to hold the remaining components of the battery cell interconnect and voltage sensing assembly 120 thereon. The plastic frame member 300 includes a rectangular shaped plate 370, a rectangular ring-shaped partition wall 374, dividing walls 378, 382, 386, and attachment tabs 390, 392.

The rectangular shaped plate 370 has a first side 400 and a second side 402 that is disposed opposite to the first side 400. The rectangular shaped plate 370 further includes elongated apertures 410, 414, 418, 422, 426, 430 extending therethrough. The elongated apertures 410, 414, 418, 422, 426, 430 extend substantially parallel to the longitudinal axis 350 of the plastic frame member 300. Further, the elongated apertures 410, 414, 418 are centered about an axis 352. Also, the elongated apertures 422, 426, 430 are centered about an axis 354. The axes 352, 354 are perpendicular to the longitudinal axis 350 and are disposed a longitudinal distance apart from one another.

Figure 4:
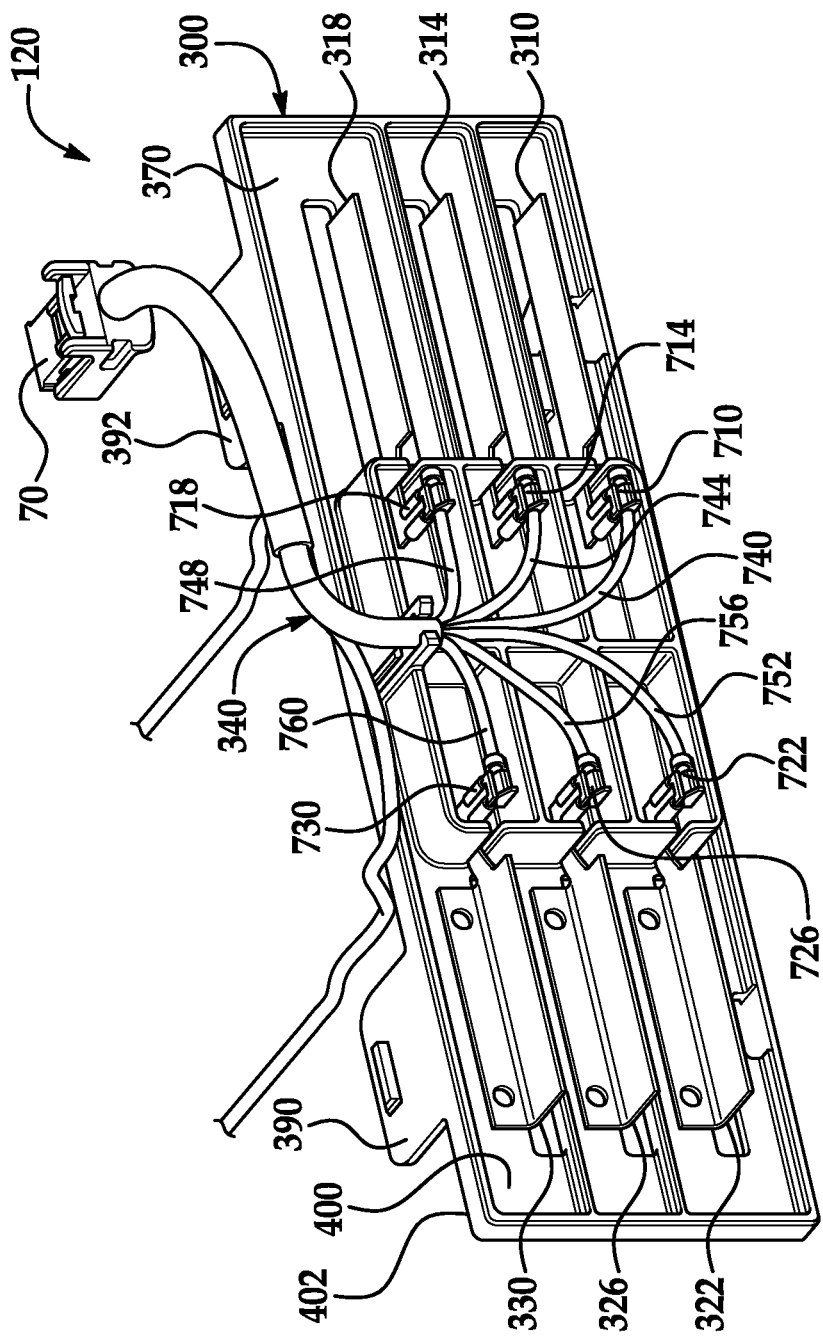
FIG. 4 is a schematic of the first battery cell interconnect and voltage sensing assembly utilized in the battery module of FIG. 1.
Figure 7:
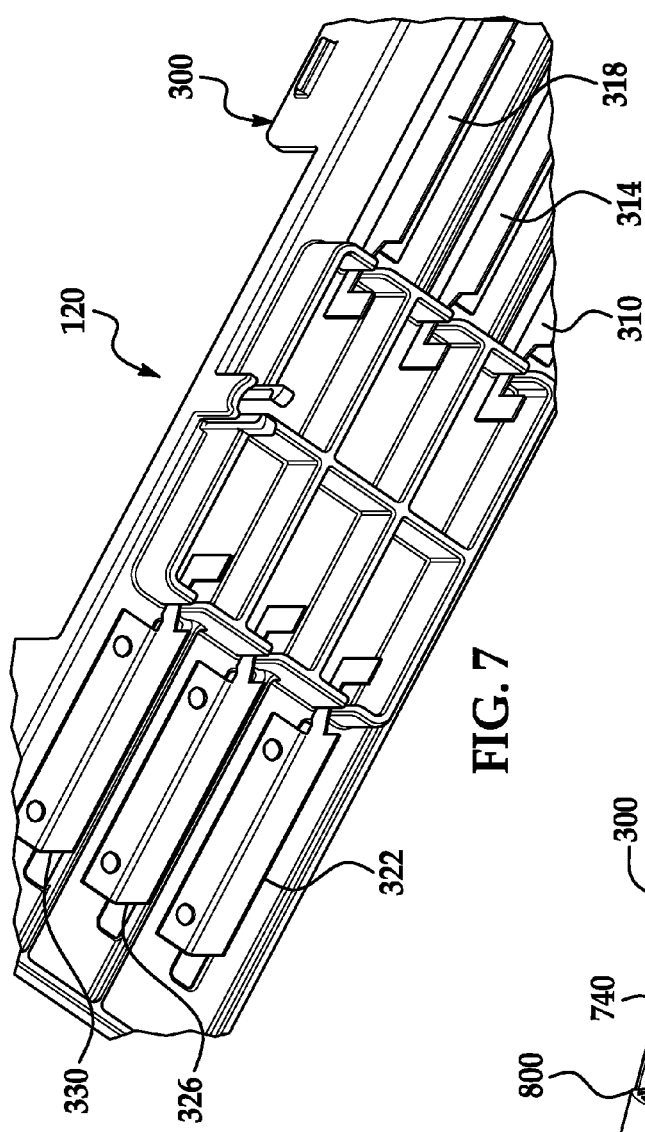
FIG. 7 is an enlarged schematic of a portion of the first battery cell interconnect and voltage sensing assembly of FIG. 4.

Referring to FIGS. 4 and 5, the rectangular ring-shaped partition wall 374 defines an interior region that is partitioned utilizing the dividing walls 378, 382, 386. The dividing walls 378, 382 extend substantially parallel to one another within the interior region defined by the rectangular ring-shaped partition wall 374. The dividing wall 386 extends substantially perpendicular to the dividing walls 378, 382 within the interior region defined by the rectangular ring-shaped partition wall 374. The walls 374, 378, 382, 386 define interior regions 540, 542, 546, 548, 550, 552. The interior regions 540, 542, 546, 548, 550, 552 have the spade clips 710, 714, 718, 722, 726, 730, respectively, disposed therein.

The rectangular ring-shaped partition wall 374 further includes grooves 510, 514, 518, 522, 526, 530 extending therethrough for receiving portions of the interconnect members 310, 314, 318, 322, 326, 330, respectively, therethrough. The groove 510 extends through the wall 374 proximate to the interior region 540. Further, the groove 514 extends through the wall 374 proximate to the interior region 542. Further, the groove 518 extends through the wall 374 proximate to the interior region 546. Further, the groove 522 extends through the wall 374 proximate to the interior region 548. Further, the groove 526 extends through the wall 374 proximate to the interior region 550. Further, the groove 530 extends through the wall 374 proximate to the interior region 552.

Referring to FIGS. 1 and 5, the attachment tabs 390, 392 are provided to attach the battery cell interconnect and voltage sensing assembly 120 to the frame member 28. The attachment tabs 390, 392 are coupled to an end of the rectangular shaped plate 370 substantially perpendicular to the plate 370.

Referring to FIGS. 2, 3, and 5, the interconnect members 310, 314, 318, 322, 326, 330 are coupled to the first side 400 of the rectangular shaped plate 370. Further, the interconnect members 310, 314, 318, 322, 326, 330 are disposed proximate to the elongated apertures 410, 414, 418, 422, 426, 430, respectively, in the rectangular shaped plate 370. In an exemplary embodiment, the interconnect members 310-330 are constructed from copper or nickel-plated copper. However, in alternative embodiments, the other electrically conducting materials can be used to construct the interconnect members 310-330. The interconnect members 310-216 have an identical structure to each other. For purposes of simplicity, only the structure of the interconnect member 310 will be discussed in greater detail below.

Figure 9:
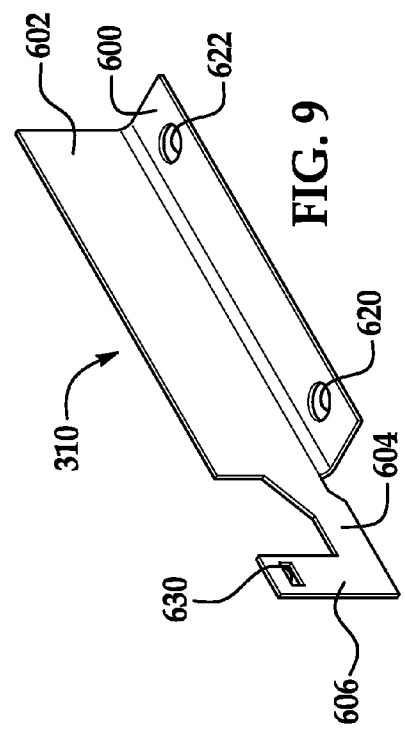
FIG. 9 is a schematic of an electrical connector utilized in the first battery cell interconnect and voltage sensing assembly of FIG. 4.

Referring to FIGS. 5 and 9, the interconnect member 310 includes a first plate portion 600, a second plate portion 602, an extension portion 604, and a spade lug 606. The second plate portion 602 is coupled to an end of the first plate portion 600 and extends substantially perpendicular to the first plate portion 600. The extension portion 604 is coupled to an end of the second plate portion 602 and extends substantially parallel to the second plate portion 602. The spade lug 606 is coupled to the extension portion 604 and extends substantially perpendicular to the first plate portion 600. The spade lug 606 is configured to be removably electrically and physically coupled to the spade clip 710. The spade lug 606 has a spade lug aperture 630 extending therethrough which is substantially rectangular-shaped and is configured to receive a latching member of the spade clip 710 therethrough.

Referring to FIGS. 2, 5 and 9, the first plate portion 600 includes apertures 620, 622 which receive first and second mounting tabs extending from the first side 400 of the rectangular shaped plate 370 for coupling the first plate portion 600 to the first side 400 of the plate 370. The second plate portion 602 is disposed proximate to the elongated aperture 410 and is electrically and physically coupled to the electrical terminals 142, 152 of the battery cells 50, 54, respectively. Further, the extension portion 604 extends through the groove 510 such that the spade lug 606 is disposed within the interior region 540. The spade clip 710 is removably attached to the spade lug 606 within the interior region 540.

The interconnect member 314 is coupled to the first side 400 of the rectangular shaped plate 370 proximate to the elongated aperture 414. The interconnect member 314 is electrically and physically coupled to the electrical terminals 162, 172 of the battery cells 58, 62, respectively. The interconnect member 314 is further electrically and physically coupled to the spade clip 714.

The interconnect member 318 is coupled to the first side 400 of the rectangular shaped plate 370 proximate to the elongated aperture 418. The interconnect member 318 is electrically and physically coupled to the electrical terminals 182, 192 of the battery cells 66, 70 respectively. The interconnect member 318 is further electrically and physically coupled to the spade clip 718.

Referring to FIGS. 3 and 5, the interconnect member 322 is coupled to the first side 400 of the rectangular shaped plate 370 proximate to the elongated aperture 422. The interconnect member 322 is electrically and physically coupled to the electrical terminals 202, 212 of the battery cells 80, 84 respectively. The interconnect member 322 is further electrically and physically coupled to the spade clip 722.

The interconnect member 326 is coupled to the first side 400 of the rectangular shaped plate 370 proximate to the elongated aperture 426. The interconnect member 326 is electrically and physically coupled to the electrical terminals 222, 232 of the battery cells 88, 92 respectively. The interconnect member 326 is further electrically and physically coupled to the spade clip 726.

The interconnect member 330 is coupled to the first side 400 of the rectangular shaped plate 370 proximate to the elongated aperture 430. The interconnect member 330 is electrically and physically coupled to the electrical terminals 242, 252 of the battery cells 96, 100 respectively. The interconnect member 330 is further electrically and physically coupled to the spade clip 730.

Referring to FIGS. 1, 4 and 5, the wire harness assembly 340 is provided to route voltages from the interconnect members 310, 314, 318, 322, 326, 330 to a battery management system 12. The wire harness assembly 340 includes spade clips 710, 714, 718, 722, 726, 730, electrical cables 740, 744, 748, 752, 756, 760, and an electrical connector 770.

Figure 8:
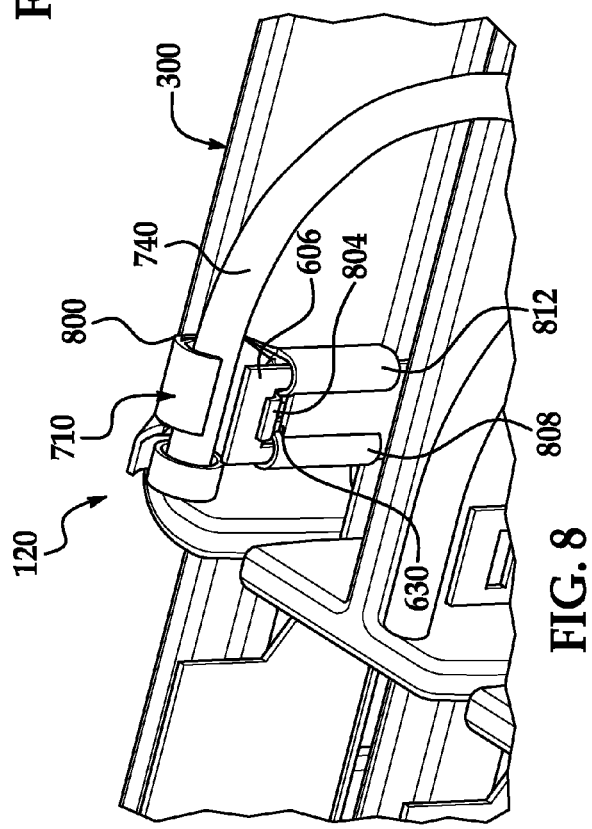
FIG. 8 is an enlarged schematic of a spade clip coupled to an electrical connector in the first battery cell interconnect and voltage sensing assembly of FIG. 4.

Referring to FIGS. 5 and 8, the structure of the spade clips 710-730 are identical to one another. Accordingly, only the structure of the spade clip 710 will be discussed in detail. The spade clip 710 is configured to be removably coupled to the spade lug 606. The spade clip 710 includes a cable coupling portion 800, a latching member 804, and mounting members 808, 812. The latching member 804 is coupled to and extends outwardly from the cable coupling portion 800. Further, the mounting members 808, 812 are substantially arcuate-shaped and are coupled to and extend from the cable coupling portion 800 such that the latching member 804 is disposed between the mounting members 808, 812. The cable coupling portion 800 is electrically and physically coupled to the electrical cable 740. The latching member 804 extends from a first side of the spade lug 606 through the aperture 630 to a second side of the spade lug 606 and engages the second side such that the latching member 804 holds the spade clip 710 on the spade lug 606. Further, the mounting members 808, 812 contact the second side of the spade lug 606 to hold the spade clip 710 on the spade lug 606.

Referring to FIGS. 4, 5 and 8, the spade lug 606 of the interconnect member 310 is electrically and physically coupled to the spade clip 710, and the spade clip 710 is electrically and physically coupled to the electrical cable 740. Further, the electrical cable 740 is electrically and physically coupled to the electrical connector 70.

The spade lug of the interconnect member 314 is electrically and physically coupled to the spade clip 714, and the spade clip 714 is electrically and physically coupled to the electrical cable 744. Further, the electrical cable 744 is electrically and physically coupled to the electrical connector 70.

The spade lug of the interconnect member 318 is electrically and physically coupled to the spade clip 718, and the spade clip 718 is electrically and physically coupled to the electrical cable 748. Further, the electrical cable 748 is electrically and physically coupled to the electrical connector 70.

The spade lug of the interconnect member 322 is electrically and physically coupled to the spade clip 722, and the spade clip 722 is electrically and physically coupled to the electrical cable 752. Further, the electrical cable 752 is electrically and physically coupled to the electrical connector 70.

The spade lug of the interconnect member 326 is electrically and physically coupled to the spade clip 726, and the spade clip 726 is electrically and physically coupled to the electrical cable 756. Further, the electrical cable 756 is electrically and physically coupled to the electrical connector 70.

The spade lug of the interconnect member 330 is electrically and physically coupled to the spade clip 730, and the spade clip 730 is electrically and physically coupled to the electrical cable 760. Further, the electrical cable 760 is electrically and physically coupled to the electrical connector 70.

Referring to FIGS. 11-15, the battery cell interconnect and voltage sensing assembly 122 in accordance with an exemplary embodiment will now be described. The assembly 122 includes a plastic frame member 900, an elongated interconnect member 910, interconnect members 914, 918, 920, 922, 926, 930, posts 932, 934, and a wire harness assembly 940.

The plastic frame member 900 is provided to hold the remaining components of the battery cell interconnect and voltage sensing assembly 122 thereon. The plastic frame member 900 includes a rectangular shaped plate 970, dividing walls 974, 976, 978, 980, 982, 984, 986, 988, 990, and attachment tabs 992, 994.

The rectangular shaped plate 970 has a first side 1000 and a second side 1002 that is disposed opposite to the first side 1000. The rectangular shaped plate 970 further includes elongated apertures 1010, 1014, 1018, 1020, 1021, 1022, 1026, 1030 extending therethrough. The elongated apertures 1010, 1014, 1018, 1020, 1021, 1022, 1026, 1030 extend substantially parallel to the longitudinal axis 950 of the plastic frame member 900. The elongated apertures 1010, 1014, 1018, 1020 are centered about an axis 952. The elongated apertures 1021, 1022, 1026, 1030 are centered about an axis 954. The axes 952, 954 are perpendicular to the longitudinal axis 950 and are disposed a longitudinal distance apart from one another.

Figure 11:
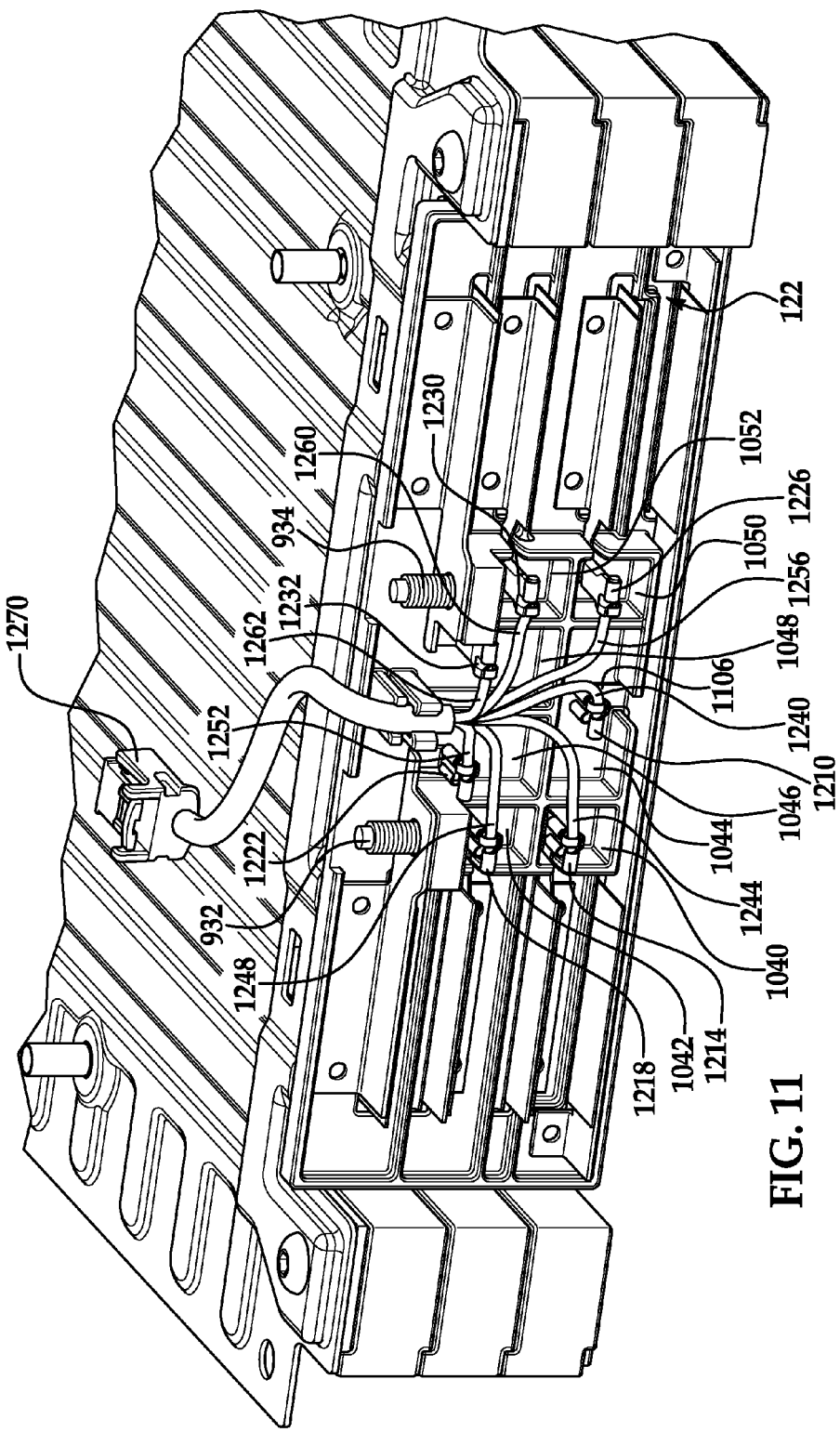
FIG. 11 is an enlarged schematic of a portion of the battery module of FIG. 10 illustrating the second battery cell interconnect and voltage sensing assembly utilized therein.
Figure 12:
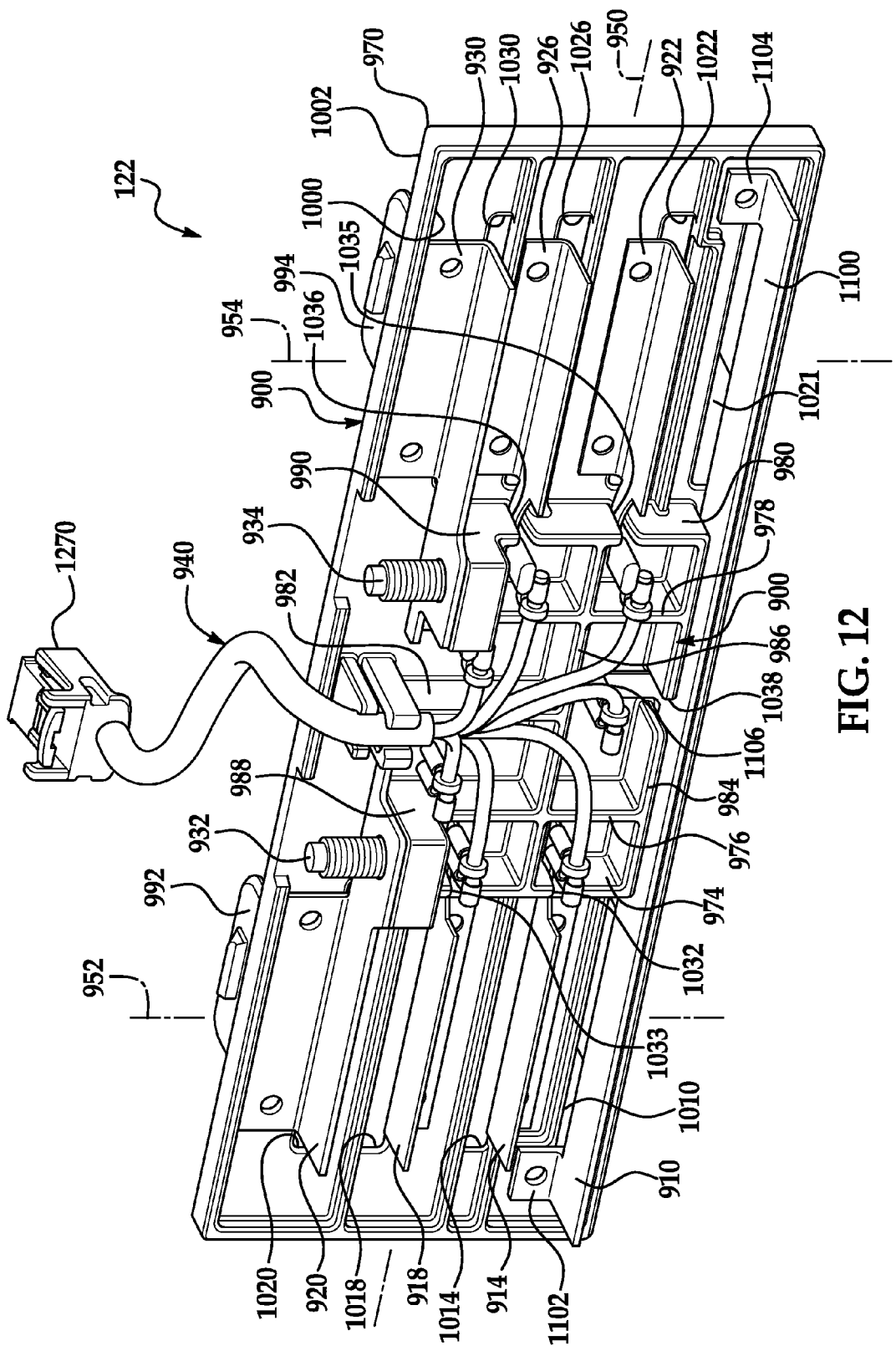
FIG. 12 is a schematic of the second battery cell interconnect and voltage sensing assembly of FIG. 11.
Figure 13:
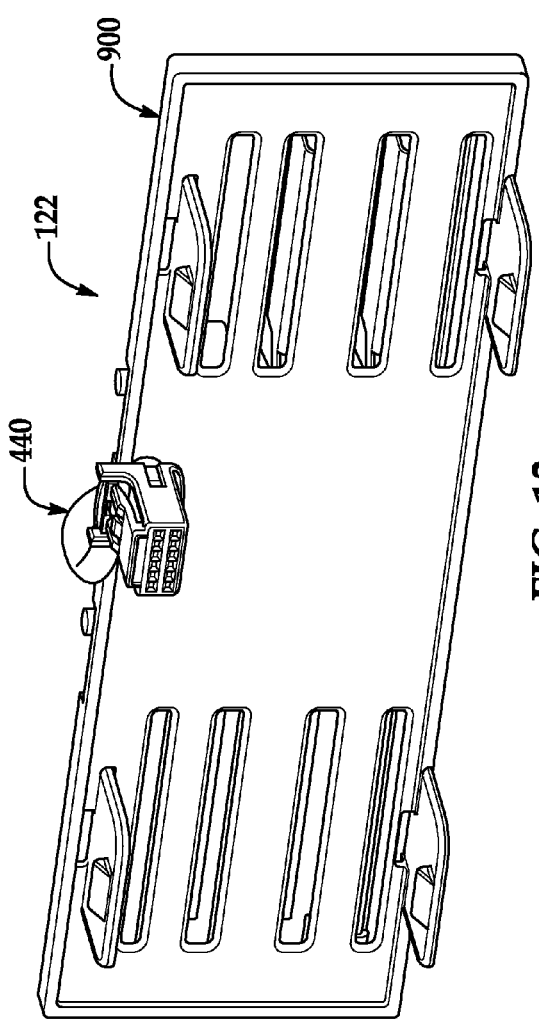
FIG. 13 is another schematic of the second battery cell interconnect and voltage sensing assembly of FIG. 11.
Figure 14:
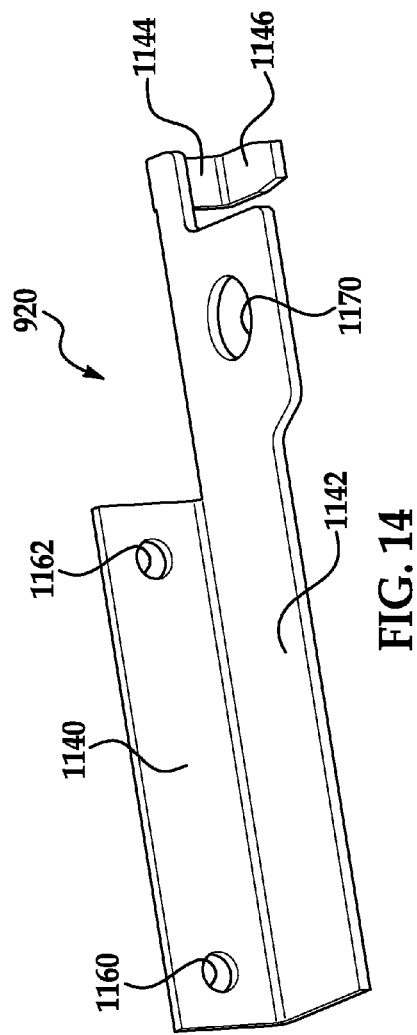
FIG. 14 is a schematic of an electrical connector utilized in the second battery cell interconnect and voltage sensing assembly of FIG. 11.
Figure 15:
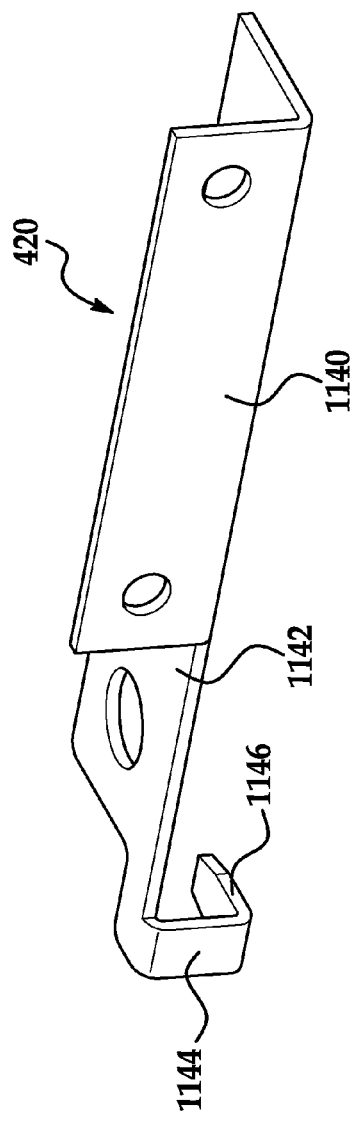
FIG. 15 is another schematic of the electrical connector of FIG. 14.
Figure 16:
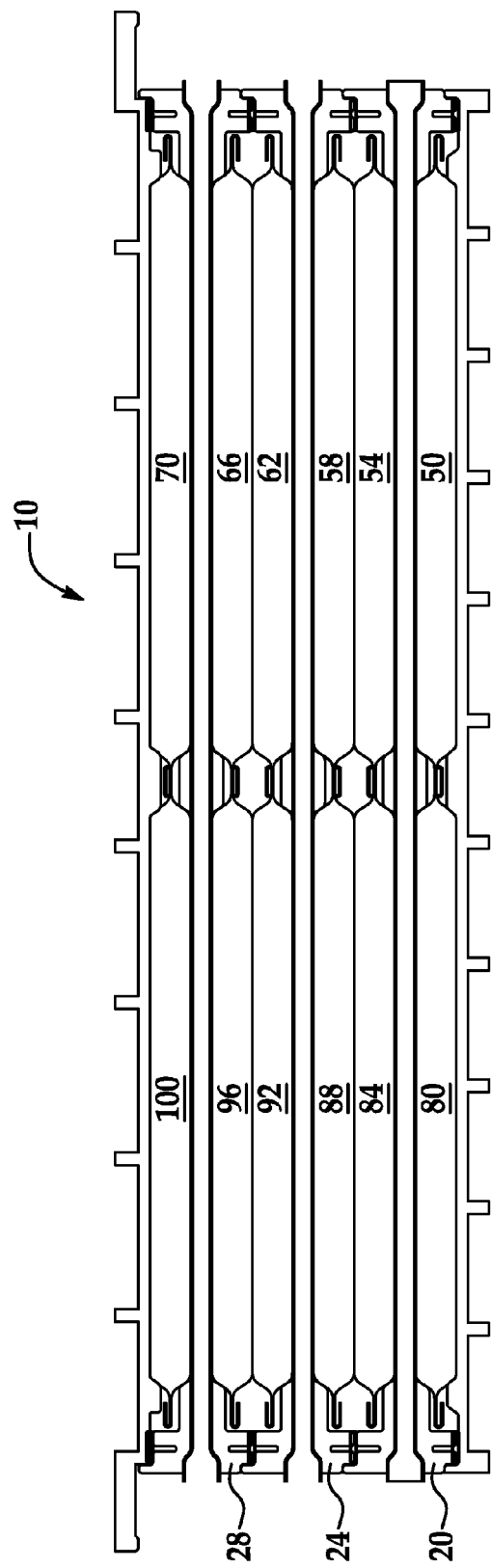
FIG. 16 is a cross-sectional schematic of a portion of the battery module of FIG. 1.

Referring to FIGS. 11 and 12, the dividing walls 974-990 extend outwardly from the first side 1000 of the rectangular shaped plate 970. The dividing walls 974-990 define interior regions 1040, 1042, 1044, 1046, 1048, 1050, 1052. As shown, the dividing walls 984, 986, 988, 990 extend substantially parallel to one another. Further, the dividing walls 974, 976, 978, 980, 982 extend substantially parallel to one another and perpendicular to the dividing walls 984, 986, 988, 990. The interior regions 1040, 1042, 1044, 1046, 1048, 1050, 1052 have the spade clips 1214, 1218, 1210, 1222, 1232, 1226, 1230, respectively, disposed therein.

The dividing wall 974 includes grooves 1032, 1033 extending therethrough for receiving portions of the interconnect members 914, 918, respectively, therethrough. The groove 1032 extends through the dividing wall 974 proximate to the interior region 1040. Further, the groove 1033 extends through the dividing wall 974 proximate to the interior region 1042.

The dividing wall 980 includes grooves 1035, 1036 extending therethrough for receiving portions of the interconnect members 922, 926, respectively, therethrough. The groove 1035 extends through the dividing wall 980 proximate to the interior region 1050. Further, the groove 1036 extends through the dividing wall 980 proximate to the interior region 1052.

The dividing wall 984 includes a groove 1038 extending therethrough for receiving a portion of the interconnect member 910 therethrough. The groove 1038 extends through the dividing wall 984 proximate to the interior region 1044.

The attachment tabs 992, 994 are provided to attach the battery cell interconnect and voltage sensing assembly 122 to the frame member 28. The attachment tabs 992, 994 are coupled to an end of the rectangular shaped plate 970 substantially perpendicular to the plate 970.

Figure 17:
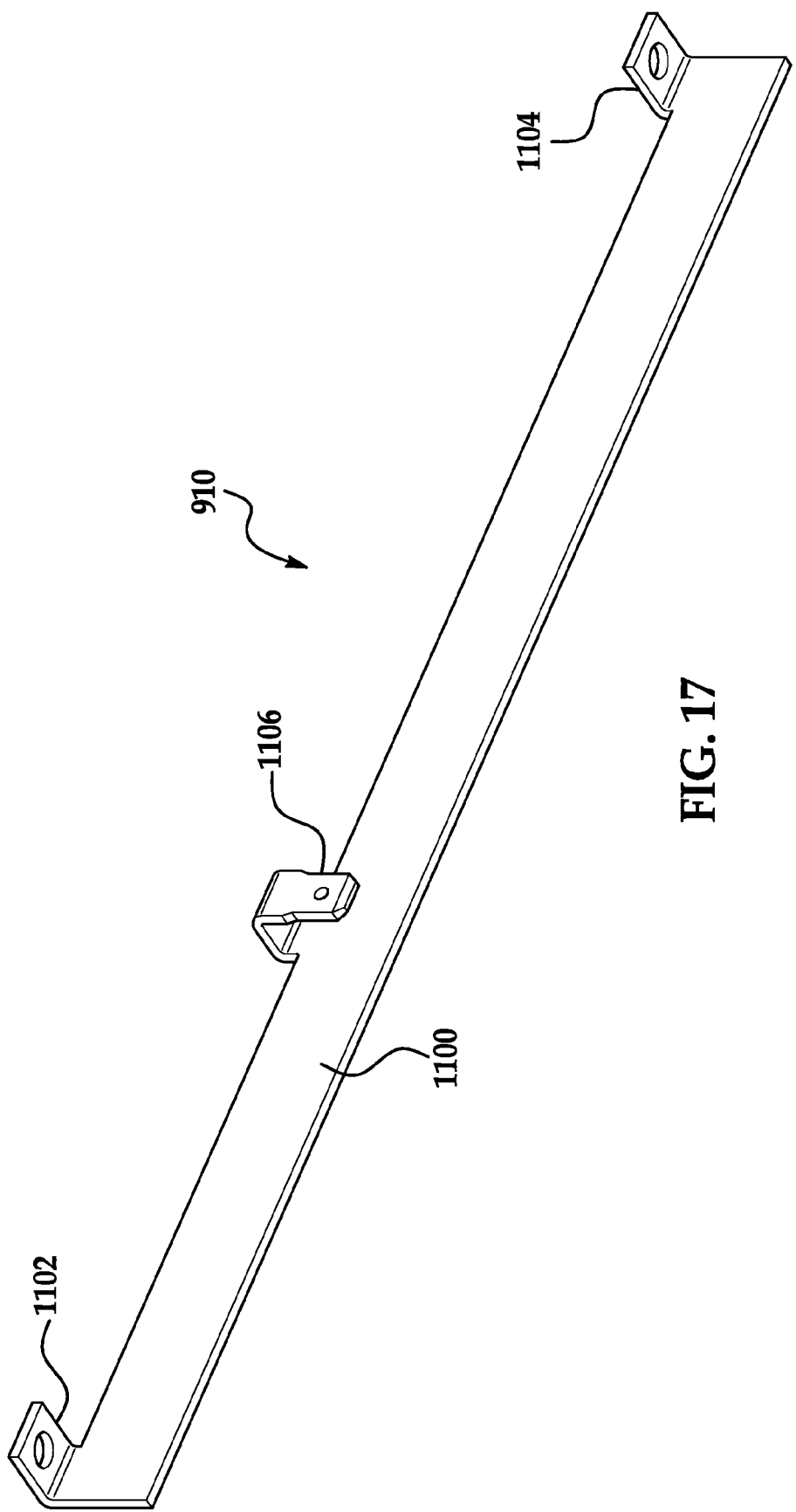
FIG. 17 is a schematic of an elongated interconnect member utilized in the second battery cell interconnect and voltage sensing assembly of FIG. 11.

Referring to FIGS. 11-12 and 17, the elongated interconnect member 910 and the interconnect members 914, 918, 920, 922, 926, 930 are coupled to the first side 1000 of the rectangular shaped plate 970. Further, the interconnect members 914, 918, 920, 922, 926, 930 are disposed proximate to the elongated apertures 1014, 1018, 1020, 1022, 1026, 1030, respectively, in the rectangular shaped plate 970. In an exemplary embodiment, the interconnect members 910-930 are constructed from copper or nickel-plated copper. However, in alternative embodiments, the other electrically conducting materials can be used to construct the interconnect members 910-930. The interconnect members 914, 918, 922, 926 have an identical structure as the interconnect member 310 discussed above.

The elongated interconnect member 910 includes a plate member 1100, mounting tabs 1102, 1104, and a spade lug 1106. The mounting tabs 1102, 1104 are coupled to first and second ends of the plate member 1100 and extend substantially perpendicular to the plate member 1100. The mounting tabs 1102, 1104 have first and second apertures, respectively, extending therethrough for receiving tabs extending outwardly from the first side 1000 of the plastic frame member 900, for coupling the elongated interconnect member 910 to the plastic frame member 900. The spade lug 1106 is coupled to the plate member 1100. The elongated interconnect member 910 extends past the elongated apertures 1010, 1021 in the plastic frame member 900. The elongated interconnect member 910 is electrically and physically coupled to both electrical terminal 144 (shown in FIG. 2) of the battery cell 50 extending through the elongated aperture 1010, and the electrical terminal 204 (shown in FIG. 3) of the battery cell 80 extending through the elongated aperture 1021.

Referring to FIGS. 2, 11 and 12, the interconnect member 914 is coupled to the first side 1000 of the rectangular shaped plate 970 proximate to the elongated aperture 1014. The interconnect member 914 is electrically and physically coupled to the electrical terminals 154, 164 of the battery cells 54, 58, respectively. The interconnect member 914 is further electrically and physically coupled to the spade clip 1214.

The interconnect member 918 is coupled to the first side 1000 of the rectangular shaped plate 970 proximate to the elongated aperture 1018. The interconnect member 918 is electrically and physically coupled to the electrical terminals 174, 184 of the battery cells 62, 66 respectively. The interconnect member 918 is further electrically and physically coupled to the spade clip 1218.

Referring to FIGS. 2, 11, 12, and 14, the interconnect member 920 is coupled to the first side 1000 of the rectangular shaped plate 970 proximate to the elongated aperture 1020. The interconnect member 920 includes a first plate portion 1140, a second plate portion 1142, an extension portion 1144, and a spade lug 1146. The second plate portion 1142 is coupled to an edge of the first plate portion 1140 and extends substantially perpendicular to the first plate portion 1140. The extension portion 1144 is coupled to an end of the second plate portion 1142 and extends substantially perpendicular to the second plate portion 1142. The spade lug 1146 is coupled to an end of the extension portion 1144 and extends substantially perpendicular to the first plate portion 1140. The spade lug 1146 is configured to be removably electrically and physically coupled to the spade clip 1222.

The first plate portion 1140 includes apertures 1160, 1162 which receive first and second mounting tabs extending from the first side 1000 of the rectangular shaped plate 970 for coupling the first plate portion 1140 to the first side 1000 of the plate 970. The second plate portion 1142 is disposed proximate to the elongated aperture 1020 and is electrically and physically coupled to the electrical terminal 194 of the battery cell 70. The second plate portion 1142 includes an aperture 1170 extending therethrough for receiving the post 932 therethrough. The interconnect member 920 is electrically coupled to the post 932. The spade clip 1222 is removably attached to the spade lug 1146.

Referring to FIGS. 3, 11 and 12, the interconnect member 922 is coupled to the first side 1000 of the rectangular shaped plate 970 proximate to the elongated aperture 1022. The interconnect member 922 is electrically and physically coupled to the electrical terminals 214, 224 of the battery cells 84, 88 respectively. The interconnect member 922 is further electrically and physically coupled to the spade clip 1026.

The interconnect member 1026 is coupled to the first side 1000 of the rectangular shaped plate 970 proximate to the elongated aperture 1026. The interconnect member 1026 is electrically and physically coupled to the electrical terminals 234, 244 of the battery cells 92, 96 respectively. The interconnect member 1026 is further electrically and physically coupled to the spade clip 1230.

The interconnect member 930 has an identical structure as the interconnect member 920 discussed above. The interconnect member 930 is coupled to the first side 1000 of the rectangular shaped plate 970 proximate to the elongated aperture 1030. The interconnect member 930 is electrically and physically coupled to the electrical terminal 254 of the battery cell 100. The interconnect member 930 is further electrically and physically coupled to the spade clip 1232. The interconnect member 913 is further electrically coupled to the post 934.

Referring to FIGS. 1, 11 and 12, the wire harness assembly 940 is provided to route voltages from the interconnect members 910, 914, 918, 920, 922, 926, 930 to the battery management system 12. The wire harness assembly 940 includes spade clips 1210, 1214, 1218, 1222, 1226, 1230, 1232, electrical cables 1240, 1244, 1248, 1252, 1256, 1260, 1262 and an electrical connector 1270. The structure of the spade clips 1210-1232 are each identical to the spade clip 710 described above.

The spade lug of the elongated interconnect member 910 is electrically and physically coupled to the spade clip 1210, and the spade clip 1210 is electrically and physically coupled to the electrical cable 1240. Further, the electrical cable 1240 is electrically and physically coupled to the electrical connector 1270.

The spade lug of the interconnect member 914 is electrically and physically coupled to the spade clip 1214, and the spade clip 1214 is electrically and physically coupled to the electrical cable 1244. Further, the electrical cable 1244 is electrically and physically coupled to the electrical connector 1270.

The spade lug of the interconnect member 918 is electrically and physically coupled to the spade clip 1218, and the spade clip 1218 is electrically and physically coupled to the electrical cable 1248. Further, the electrical cable 1248 is electrically and physically coupled to the electrical connector 1270.

The spade lug of the interconnect member 920 is electrically and physically coupled to the spade clip 1222, and the spade clip 1222 is electrically and physically coupled to the electrical cable 1252. Further, the electrical cable 1252 is electrically and physically coupled to the electrical connector 1270.

The spade lug of the interconnect member 922 is electrically and physically coupled to the spade clip 1226, and the spade clip 1226 is electrically and physically coupled to the electrical cable 1256. Further, the electrical cable 1256 is electrically and physically coupled to the electrical connector 1270.

The spade lug of the interconnect member 926 is electrically and physically coupled to the spade clip 1230, and the spade clip 1230 is electrically and physically coupled to the electrical cable 1260. Further, the electrical cable 1260 is electrically and physically coupled to the electrical connector 1270.

The spade lug of the interconnect member 930 is electrically and physically coupled to the spade clip 1232, and the spade clip 1232 is electrically and physically coupled to the electrical cable 1262. Further, the electrical cable 1262 is electrically and physically coupled to the electrical connector 1270.

Referring to FIGS. 1, 2 and 3, during operation, the first and second battery cell interconnect and voltage sensing assemblies 120, 122 electrically couple the battery cells 50, 54, 58, 62, 66, 70, 80, 84, 88, 92, 96, 100 in series with one another. Further, the first and second battery cell interconnect and voltage sensing assemblies 120, 122 are electrically coupled to the battery management system 12. Thus, the battery management system 12 can measure operational voltages at specific electrical nodes in the battery cell circuit from the interconnect members 310, 314, 318, 322, 326, 330 of the assembly 120, and further receives voltages from the interconnect members 910, 914, 918, 920, 922, 926, 930 of the assembly 122, and can store values corresponding to operational voltages in a memory device. Further, the battery management system 12 can determine the state-of-charge and state-of-health of the associated battery cells based on the stored values. In an exemplary embodiment, the battery management system 12 includes a programmable computer therein.

The battery cell interconnect and voltage sensing assemblies and the battery module described herein provide a substantial advantage over other assemblies and modules. In particular, the battery cell interconnect and voltage sensing assemblies and battery module electrically couple together two adjacent stacks of battery cells and route associated voltages to electrical connectors for control and diagnostic purposes.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell interconnect and voltage sensing assembly, comprising:
  a plastic frame member having a first side and a second side, the plastic frame member having first, second, third and fourth elongated apertures extending therethrough; the first, second, third and fourth elongated apertures extending substantially parallel to a longitudinal axis of the plastic frame member, the first and second elongated apertures being centered about a first axis, the third and fourth elongated apertures being centered about a second axis, the first and second axes being perpendicular to the longitudinal axis and disposed a longitudinal distance apart from one another;
  an elongated interconnect member being coupled to the plastic frame member and extending past both the first and third apertures, the elongated interconnect member being configured to be electrically and physically coupled to both a first electrical terminal of a first battery cell extending through the first elongated aperture, and a first electrical terminal of a second battery cell extending through the third elongated aperture; the elongated interconnect member having a spade lug;
  a first interconnect member being coupled to the plastic frame member on the first side thereof, the first interconnect member being configured to be electrically and physically coupled to a first electrical terminal of a third battery cell extending through the second elongated aperture, the first interconnect member having a spade lug;
  a second interconnect member being coupled to the plastic frame member on the first side thereof, the second interconnect member being configured to be electrically and physically coupled to a first electrical terminal of a fourth battery cell extending through the fourth elongated aperture, the second interconnect member having a spade lug; and
  a wire harness assembly having first, second, and third spade clips; the first spade clip being electrically and physically coupled to the spade lug of the elongated interconnect member; the second spade clip being electrically and physically coupled to the spade lug of the first interconnect member; the third spade clip being electrically and physically coupled to the spade lug of the second interconnect member.

2. The battery cell interconnect and voltage sensing assembly of claim 1, wherein the spade lug of the first interconnect member has a spade lug aperture extending therethrough.

3. The battery cell interconnect and voltage sensing assembly of claim 2, wherein the spade lug aperture is substantially rectangular-shaped and is configured to receive a latching member of the second spade clip therethrough.

4. The battery cell interconnect and voltage sensing assembly of claim 1, wherein the first interconnect member has first and second plate portions, an extension portion, and the spade lug thereof; the second plate portion being coupled to an end of the first plate portion and extending substantially perpendicular to the first plate portion; the extension portion being coupled to an end of the second plate portion and extending substantially parallel to the second plate portion; the spade lug of the first interconnect member being coupled to the extension portion and extending substantially perpendicular to the first plate portion.

5. The battery cell interconnect and voltage sensing assembly of claim 4, wherein the first plate portion is coupled to the plastic frame member.

6. The battery cell interconnect and voltage sensing assembly of claim 1, further comprising first, second, and third electrical cables, and an electrical connector; the first electrical cable being electrically and physically coupled to both the first spade clip and the electrical connector, the second electrical cable being electrically and physically coupled to both the second spade clip and the electrical connector, the third electrical cable being electrically and physically coupled to both the third spade clip and the electrical connector.

7. A battery module, comprising:
  a first battery cell having a first housing and first and second electrical terminals extending outwardly from first and second ends, respectively, of the first housing;
  a second battery cell having a second housing and first and second electrical terminals extending outwardly from first and second ends, respectively, of the second housing;
  a third battery cell having a third housing and first and second electrical terminals extending outwardly from first and second ends, respectively, of the third housing;

a fourth battery cell having a fourth housing and first and second electrical terminals extending outwardly from first and second ends, respectively, of the fourth housing;

a first battery cell interconnect and voltage sensing assembly having a first plastic frame member, an elongated interconnect member, a first interconnect member, a second interconnect member, and a first wire harness assembly;

the first plastic frame member having a first side and a second side, the first plastic frame member having first, second, third and fourth elongated apertures extending therethrough; the first, second, third and fourth elongated apertures extending substantially parallel to a longitudinal axis of the first plastic frame member, the first and second elongated apertures being centered about a first axis, the third and fourth elongated apertures being centered about a second axis, the first and second axes being perpendicular to the longitudinal axis and disposed a longitudinal distance apart from one another;

the elongated interconnect member being coupled to the first plastic frame member and extending past both the first and third apertures, the elongated interconnect member being configured to be electrically and physically coupled to both the first electrical terminal of the first battery cell extending through the first elongated aperture, and the first electrical terminal of the second battery cell extending through the third elongated aperture; the elongated interconnect member having a spade lug;

the first interconnect member being coupled to the first plastic frame member on the first side thereof, the first interconnect member being electrically and physically coupled to the first electrical terminal of the third battery cell extending through the second elongated aperture, the first interconnect member having a spade lug;

the second interconnect member being coupled to the first plastic frame member on the first side thereof, the second interconnect member being electrically and physically coupled to the first electrical terminal of the fourth battery cell extending through the fourth elongated aperture, the second interconnect member having a spade lug; and a first wire harness assembly having first, second, and third spade clips; the first spade clip being electrically and physically coupled to the spade lug of the elongated interconnect member; the second spade clip being electrically and physically coupled to the spade lug of the first interconnect member; the third spade clip being electrically and physically coupled to the spade lug of the second interconnect member.

8. The battery module of claim 7, wherein the spade lug of the first interconnect member has a spade lug aperture extending therethrough.

9. The battery module of claim 8, wherein the spade lug aperture is substantially rectangular-shaped and is configured to receive a latching member of the second spade clip therethrough.

10. The battery module of claim 7, wherein the first interconnect member has first and second plate portions, an extension portion, and the spade lug thereof; the second plate portion being coupled to an end of the first plate portion and extending substantially perpendicular to the first plate portion; the extension portion being coupled to an end of the second plate portion and extending substantially parallel to the second plate portion; the spade lug of the first interconnect member being coupled to the extension portion and extending substantially perpendicular to the first plate portion.

11. The battery module of claim 10, wherein the first plate portion is coupled to the first plastic frame member.

12. The battery module of claim 7, further comprising first, second, and third electrical cables, and an electrical connector; the first electrical cable being electrically and physically coupled to both the first spade clip and the electrical connector, the second electrical cable being electrically and physically coupled to both the second spade clip and the electrical connector, the third electrical cable being electrically and physically coupled to both the third spade clip and the electrical connector.

13. The battery module of claim 7, further comprising a second battery cell interconnect and voltage sensing assembly being electrically and physically coupled to the second electrical terminal of the first battery cell, the second electrical terminal of the second battery cell, the second electrical terminal of the third battery cell, and the second electrical terminal of the fourth battery cell.

* * * * *